(12) United States Patent
Demille

(10) Patent No.: US 12,145,495 B2
(45) Date of Patent: Nov. 19, 2024

(54) BONDING EQUIPMENT SAFETY APPARATUS, A BONDING EQUIPMENT SAFETY SYSTEM AND RELATED METHOD OF USE

(71) Applicant: Jeffrey Demille, Eagle Mountain, UT (US)

(72) Inventor: Jeffrey Demille, Eagle Mountain, UT (US)

(*) Notice: Subject to any disclaimer, the term of this patent is extended or adjusted under 35 U.S.C. 154(b) by 161 days.

(21) Appl. No.: 17/751,649

(22) Filed: May 23, 2022

(65) Prior Publication Data

US 2023/0044164 A1 Feb. 9, 2023

Related U.S. Application Data

(63) Continuation-in-part of application No. 17/695,890, filed on Mar. 16, 2022, now abandoned.

(60) Provisional application No. 63/161,924, filed on Mar. 16, 2021.

(51) Int. Cl.
*B60P 3/22* (2006.01)
*B64F 1/28* (2006.01)

(52) U.S. Cl.
CPC .............. *B60P 3/2275* (2013.01); *B64F 1/28* (2013.01)

(58) Field of Classification Search
CPC .......... B60P 3/2275; B64F 1/28; B64D 45/02; B64D 37/32; B64D 37/00
USPC ....................................................... 361/220
See application file for complete search history.

(56) References Cited

U.S. PATENT DOCUMENTS

| | | | | |
|---|---|---|---|---|
| 3,176,931 A | * | 4/1965 | Hannay | B65H 75/4434 191/12.2 R |
| 5,159,523 A | * | 10/1992 | Claassen | H05F 3/02 361/216 |
| 6,601,669 B1 | * | 8/2003 | Agnew | B60K 28/10 180/170 |
| 7,318,460 B2 | * | 1/2008 | Ohishi | B60K 15/04 141/94 |
| 10,766,760 B2 | * | 9/2020 | Tillotson | B67D 7/421 |
| 2013/0007650 A1 | * | 1/2013 | Van Hoy | B64F 1/28 715/771 |
| 2013/0112295 A1 | * | 5/2013 | McNicholas | B67D 7/3281 137/551 |

FOREIGN PATENT DOCUMENTS

WO WO-0048434 A1 * 8/2000 ............... H05F 3/02

* cited by examiner

*Primary Examiner* — Thienvu V Tran
*Assistant Examiner* — Sreeya Sreevatsa
(74) *Attorney, Agent, or Firm* — Jacob Ong; Ongs Law Firm PLLC

(57) ABSTRACT

A bonding equipment safety apparatus for the prevention of damage to aircraft or other aircraft refueling equipment. This apparatus has a housing with a proximity sensor mounted within that detects if the door of the housing has been closed by the attachment of a bonding cable and clamp, which detection then engages a control system influencing the movement of the fueling vehicle, ensuring that the bonding cable equipment has been properly detached from the aircraft and stowed before allowing the aircraft refueling vehicles and equipment to move away from the aircraft and cause damage.

14 Claims, 13 Drawing Sheets

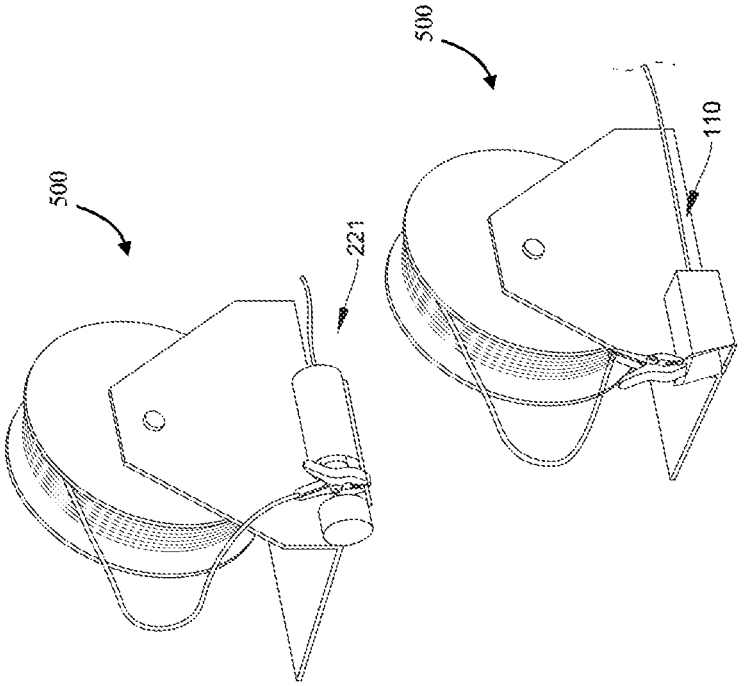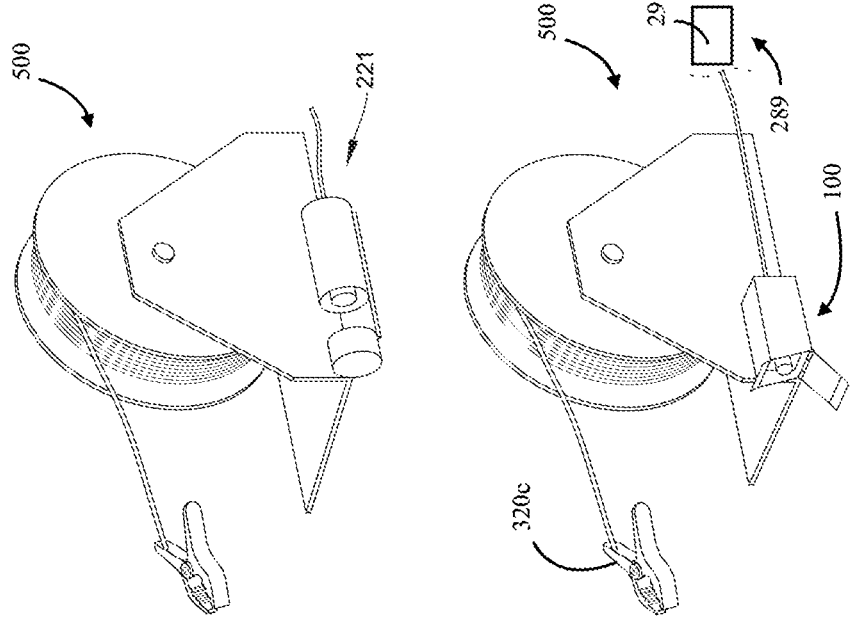

BONDING EQUIPMENT SAFETY APPARATUS, A BONDING EQUIPMENT SAFETY SYSTEM AND RELATED METHOD OF USE

CROSS-REFERENCE TO RELATED APPLICATIONS

This application incorporates by reference and claims the benefit of U.S. patent Ser. No. 17/695,890, which was filed on Mar. 16, 2022, and U.S. patent Ser. No. 17/695,890 claims the benefit of provisional application 63/161,924, which was filed on Mar. 16, 2021.

BACKGROUND OF THE INVENTION

The Field of the Invention

The present invention generally relates to devices and systems that increase safety for vehicles, such as trucks, fueling tankers, drivers, and airplanes.

Background

When an aircraft is in flight, it may build up large amounts of static electricity that may not be adequately dissipated. The aircraft will land on the ground, and this accumulation of static electricity on the aircraft may be hazardous to a fueling truck since the fueling truck may be one of the first things to come in contact with the aircraft. For safety when refueling, it is an industry-standard in the United States that a bonding cable assembly, which may include at least one clamp coupled to a bonding cable, must be connected to the aircraft to minimize the chance of a spark resulting from the accumulation of static electricity. The bonding cable assembly may be used to equalize the static electricity for the duration of fueling. However, after a fueler, that is a person with the duty to fuel an aircraft, is done fueling an aircraft, there is a real risk that the fueler may fail to disconnect the cable from the aircraft before driving away. This can result in thousands of dollars in damage to the aircraft. In some instances, the fueler may walk or drive away while leaving the bonding cable or the bonding cable clamp detachably coupled to the aircraft or aircraft landing gear, which may cause problems to the aircraft when the aircraft is being prepared for takeoff or when the aircraft is in the air since a dangling bonding cable may necessitate the premature grounding of the aircraft.

Currently, the industry has a standard safety interlock system for all fuel hoses, which may decrease the probability that a user will drive away while the fuel hose is still connected to the aircraft. For example, some fuel trucks use a brake interlock system where: "The metal plate on this bottom fill coupling must be closed to depress the micro switch to release the brakes. The metal plate cannot be closed until the hose is disconnected." (Fueling Inspections, Federal Aviation Administration, Powerpoint deck available at https://www.icao.int/NACC/Documents/Meetings/2012/2012AerodromeCertification/ACIW11.pdf; accessed on Feb. 4, 2020, see FIG. 1B for a depiction of an embodiment of a safety interlock system.

However, it is still possible, and even probable, for a fueler to be reminded by the safety interlock system to remove the fuel hose but still forget to remove the bonding cable or the bonding cable clamp. A need exists for improving safety measures to reduce the risk or even prevent fuelers from failing to remove the bonding cable or bonding cable clamp from being detachably coupled to an aircraft that has been refueled.

SUMMARY

A bonding equipment safety apparatus and a bonding equipment safety system are disclosed, which may be communicatively connected to an off switch, or connected to a brake interlock system of a fueling truck, and serve to remind or even prevent fuelers, or even a self-driving truck, from leaving a bonding cable or bonding cable clamp detachably coupled to an airplane. In a bonding equipment safety system, switching the bonding equipment safety apparatus into an off position may then communicate to a brake interlock system to lock the brakes of a vehicle; or in some embodiments, switching the bonding equipment safety apparatus into an off position may then temporarily physically switch, in some embodiments via the brake interlock system, the brakes or braking system of a vehicle into an off position. Switching the bonding equipment safety apparatus into an on position may then communicate to a brake interlock system to unlock the brakes of a vehicle; or in some embodiments, switching the bonding equipment safety apparatus into an on position may then temporarily physically switch, in some embodiments via the brake interlock system, the brakes or braking system of a vehicle into an on position.

The disclosed bonding equipment safety system may be used as a safety device to engage the interlock brakes on mobile fuel equipment, when the mobile fuel equipment's bonding cable is disconnected from the product. An example of mobile fuel equipment is a fueling truck but may include other types of vehicles.

The bonding equipment safety apparatus may be directly mounted onto mobile fueling equipment and may be within reach of the mobile fuel equipment's bonding cable, plug, or clamp and the mobile fuel equipment's interlocking brake system. The bonding equipment safety apparatus may be connected to the mobile fuel equipment's interlock brake system through electrical wires or airlines, thereby forming a bonding cable safety system.

When mobile fuel equipment does not need bonding to aircraft or equipment receiving fuel, the bonding cable, and associated gear, such as the bonding cable clamp, should be preferably coupled to the bonding cable safety apparatus, such as by clamping, plugging, stowing or attaching the bonding cable to the product. When the bonding cable clamp or plug is detached from the product, the interlocking brake system on the mobile fueling equipment may engage the brakes, preventing the mobile fuel equipment from moving. The bonding equipment safety system may engage the brakes by use of a proximity sensor, electronic switch, pneumatic valve, or similar device, depending on the brake interlock system of the mobile fuel equipment. When the bonding cable clamp or plug is removed from the product, the proximity sensor, electronic switch, pneumatic valve, or similar device signals the mobile fuel equipment's built-in interlocking brake system. When the clamp or plug is reattached to the product, the interlock brake system on the mobile fueling equipment may be released, and the mobile fuel equipment may then be moveable or drivable. Many methods may be used to trigger the sensor or switch, as long as the action of removing or attaching the bonding clamp or plug initiates the change to the sensor, switch, or similar device.

For example, a vertical pole may be coupled to a proximity sensor, and a ring may be attached to the vertical pole, such that when a clip is coupled to the vertical pole at an upper position such that the ring is located above the clip and the clip and ring are located sufficiently distant from a sensor such as a proximity sensor so as to not activate the sensor.

Coupled means to be in direct or indirect contact with another object; in preferred embodiments two or more objects that are coupled may be affixed by some type of physical or nonphysical means such as glue, screw, nail, mating connections, soldering, which also includes being detachably affixed which means that a relatively temporary means has been used to affix the two or more objects. Nonphysical means include magnetic forces. Detachably coupled refers to temporary coupling such as a ball bearing to a surface where the physical contact between the two objects can be easily removed by gravity or other weak force. As mentioned above, indirect coupling includes Object A being coupled to Object B and Object C being coupled to Object B would mean that Object A is coupled to Object C even if Object A is not physically contacting Object C. Additional elements may be coupled to each other in this manner.

BRIEF DESCRIPTION OF THE DRAWINGS

The preferred embodiments of the present invention will be described in conjunction with the appended drawings. Like designations denote like elements, and:

in FIG. 4A, the dotted line shows the cutting plane line, and the arrow labeled 4B in FIG. 4A shows the view direction of the sectional view of FIG. 4B;

FIG. 7A depicts some embodiments of a bonding equipment safety apparatus 100 directly coupled to a reel; when the apparatus 100 is in fueling mode, the bonding cable preferably is couplable to an aircraft (not shown); and since the bonding cable clamp is not shown coupled to bonding equipment safety apparatus 100 in proximity to a sensor, then the braking system of the vehicle may be in or may be switched to an "on position" thereby hindering the vehicle from moving;

Referring to FIG. 7B, some embodiments of bonding equipment safety apparatus 100 are in a closed position when the clamp is clamped to the base member of the bonding equipment safety apparatus 100 in a location such that a sensor, such as a proximity sensor, can sense the presence of the clamp and thereby, the proximity sensor may alert directly or indirectly a braking system of the presence of the clamp, and the braking system may then be set to an off position so that a driver may drive the vehicle without interference from the braking system;

Referring to FIG. 7C, in some embodiments, the door of bonding equipment safety apparatus 100 is in an open position, such that a proximity sensor or other sensor fails to detect the door, such that a braking system that is coupled to the proximity sensor thereby switches on or maintains the brakes of a vehicle into an on position;

Referring to FIG. 7D, in some embodiments, the door of bonding equipment safety apparatus 100 is in a closed position, such that a proximity sensor or other sensor detects the presence of the door;

DETAILED DESCRIPTION

It will be readily understood that the components of the present invention, as generally described with reference to the drawings herein, could be implemented in a wide variety of different configurations. Thus, the following more detailed description of the embodiments of the system and method of the present invention, is not intended to limit the scope of the invention, but is merely representative of various embodiments of the invention. Unless explicitly stated, the use of "or" means and/or, that is, this is the non-exclusive meaning of "or".

The following listing of parts and components that may be used are non-limiting examples. Any reference to a specific material, such as plastic or metal, is a non-limiting example.

In some embodiments, a bonding equipment safety apparatus 100 may have a tube, a holster, or a tube and holster.

In some embodiments, a bonding equipment safety apparatus 100 may have a designated clamping area, such that when the clamp is clamped to the clamping area, the clamp is sufficiently distanced from a sensor, such as a proximity sensor, such that the proximity sensor does not sense the presence of the clamp. Although in some preferred embodiments a proximity sensor is the sensor of the housing, in some other embodiments, other sensors that are not proximity sensors but can detect the presence of an object and maybe substituted for the proximity sensor herein; for example, a light sensor, color sensor, or infra-red sensor or other type of sensor may detect an object, such as an object disposed on a door hingedly connected to the housing that may be depicted by the sensor.

Figure 1A:
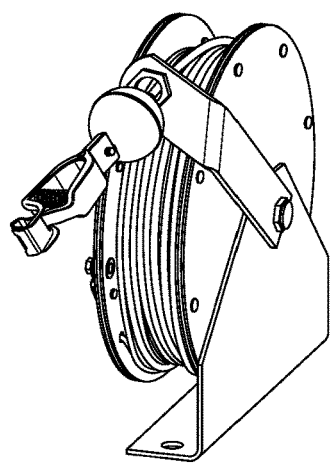
FIG. 1A depicts an embodiment of a prior art grounding cable reel.
Figure 1B:
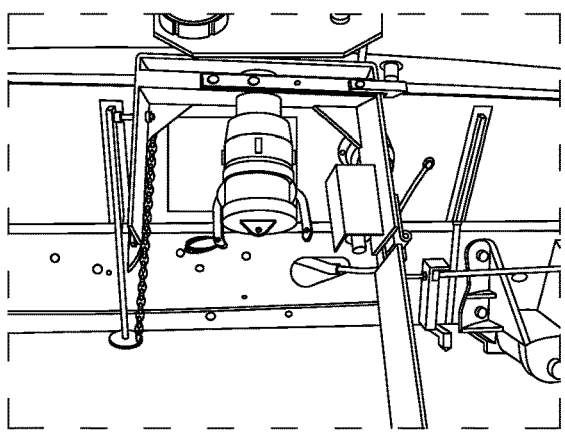
FIG. 1B is a depiction of an embodiment of a prior art safety interlock system.
Figure 1C:
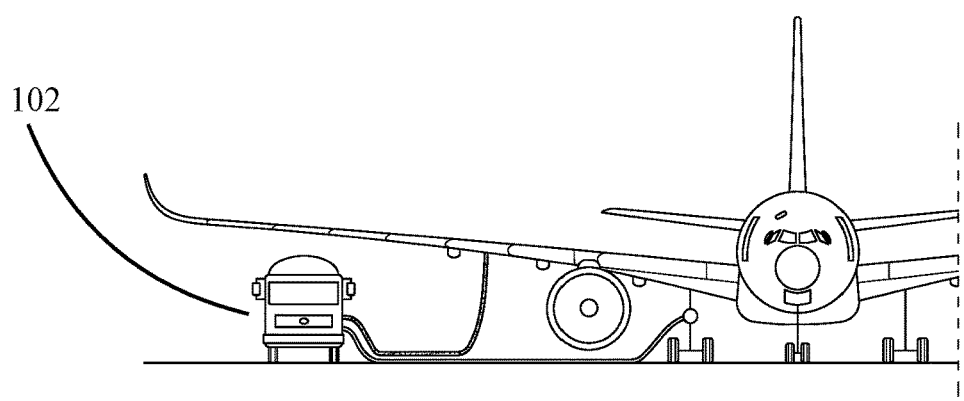
FIG. 1C depicts a schematic of some prior art embodiments of a system in which an aircraft is connected to a vehicle by a bonding cable, and the vehicle is connected to an airplane by a refueling hose.
Figure 2A:
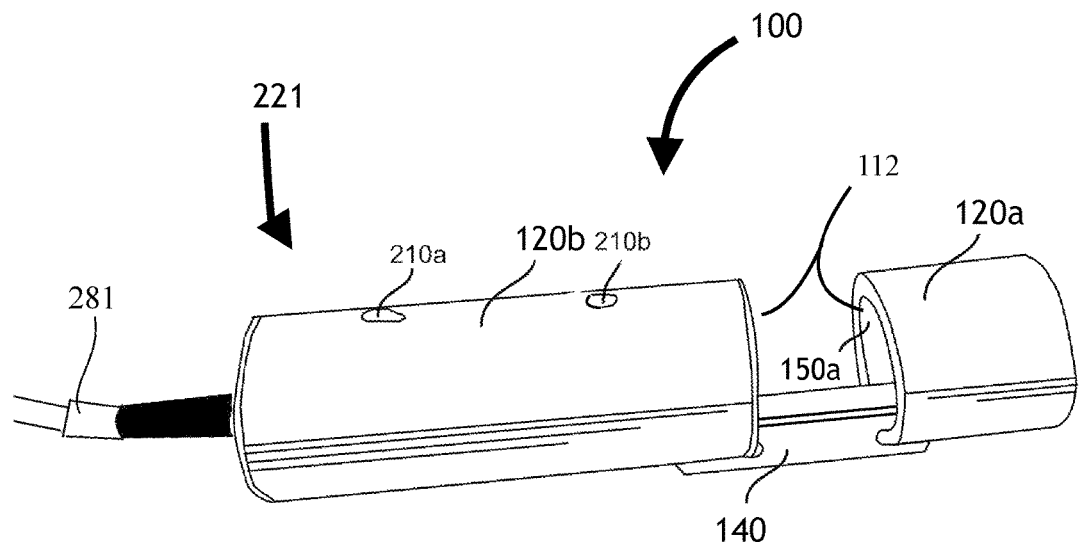
FIG. 2A depicts a side view of an embodiment of a bonding equipment safety apparatus.

Referring to FIG. 2A, housing 221 may be a substantially rigid casing, such as a tubing or case, that is sufficiently rigid so as to protect an object, such as a sensor, that is disposed within the housing. Rigid tubing may be constructed of steel or a similar substance, may be approximately 4 inches long and 1½ inches in diameter (alternatively dimensions of the rigid tubing may range between 15% to 1,000% of 4 inches long and also between 15% to 1,000% of 1½ inches in diameter. Second member 120b of housing 221 may be large enough to cover the entire proximity sensor 290. Second member 120b of housing 221 may be constructed of steel, plastic, metal, metal alloy, or other substance. Such materials may include but are not hereby limited to plastics, metals, polycarbonates, nylon, liquid crystal polymers, and/or rubber, thermoplastic urethanes, polyethylenes, and/or polypropylenes, mixtures thereof and the like. Housing 221 may have a gap separating a first hollow member 120a, that defines a first cavity 150a, and a second member 120b that defines a second cavity 150b. Sensor cable 281 may be coupled to a sensor that is not shown in FIG. 2A and extend from a housing to a switch assembly for controlling a brake system or a vehicular movement control system.

In some embodiments, the second member 120b is longer or larger than first member 120a. An upper portion 124 of second member 120b may provide a surface for a clamp such that the distance between a clamp clamped to the upper portion 124 of second member 120b may be sufficient so as to not trigger a sensor disposed within the second compartment 120b. Referring to FIG. 2A, base member 140 may be a rod, plate, or flange.

Figure 2B:
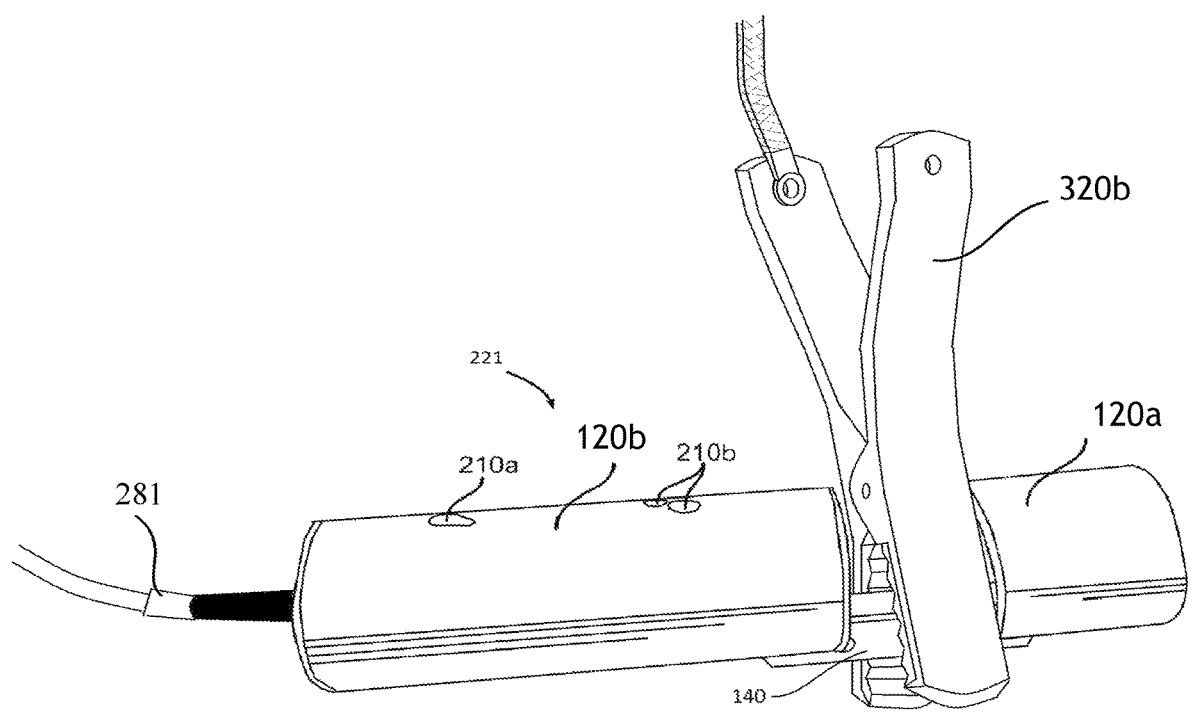
FIG. 2B depicts a side view of an embodiment of the bonding equipment safety apparatus, shown in FIG. 2A, which is coupled to a bonding cable clamp.

Referring to FIG. 2B, a clamp 320b, made of metal, plastic or other substance customarily used for clamps, may be clamped to a base member 140. Base member 140 may be a rod, platform, plate, elongated member, and preferably has at least one surface with a width that is within a range that a clamp may be attached to the surface. Clamp may be an alligator clip, such a device with a sprung metal clip and elongated, serrated jaws which is used for creating a temporary electrical connection. Clamp may be coupled to a bonding cable, which may be used to diffuse static electricity. A user may couple one end of a bonding cable to an aircraft and the other end of the bonding cable to bonding equipment safety apparatus 100.

A first hollow member 120a may define a first cavity 150a; first hollow member 120a may be rectangular, a polyhedron, shaped as a Tube or half-Tube, or may be tubular.

First cavity 150a may be a hole of the first hollow member 120a of housing 221; first hollow member 120a may have a mountable flange configured to detachably mate with a clamp. First hollow member 120a may have an enclosed end and an opened end; alternatively, first hollow member 120a may fully enclose or substantially enclose first cavity 150a. In some embodiments, the first hollow member 120a may have a first opened end and an enclosed end that includes a second opened end that has been capped with a cap 160 (see FIG. 4 for a depiction of some embodiments).

Cap 160 may be made of metal, plastic, or any other similar substance that has the similar function. In some embodiments, cap 160 is excluded or removed. One purpose of cap 160 is to reduce the likelihood that a user would clamp the clamp to first hollow member 120a in such a location that the clamp is beyond the sensing range of the proximity sensor 290.

FIG. 2B depicts some embodiments of bonding equipment safety apparatus 100; base member 140 is preferably of sufficient length so as to provide a clampable clamping surface mateably couplable to a clamp, such as an alligator clip.

Mounting hole 210a may be disposed of in second member 120b. Mounting hole 210b may be disposed of in second member 120b. Mounting holes 210a, 210b may each receive at least one fastener; thereby, coupling via fasteners, the bonding equipment safety apparatus 100 to a vehicle 102, such as a truck; In some embodiments, the bonding equipment safety apparatus 100 may be coupled to a vehicle 102 or a portion of a vehicle 102 by glue, magnets, a welded bond, or other structures used to fasten objects to a vehicle 102.

Figure 2C:
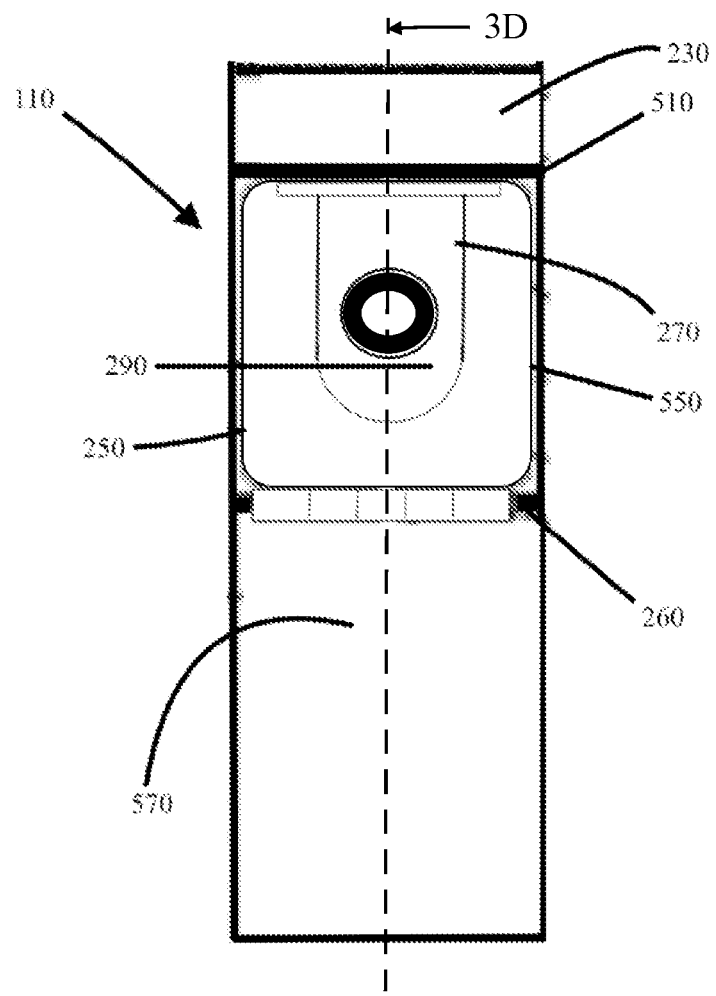
FIG. 2C depicts a front view schematic of the embodiment of the bonding equipment safety apparatus depicted in FIG. 3C.
Figure 3A:
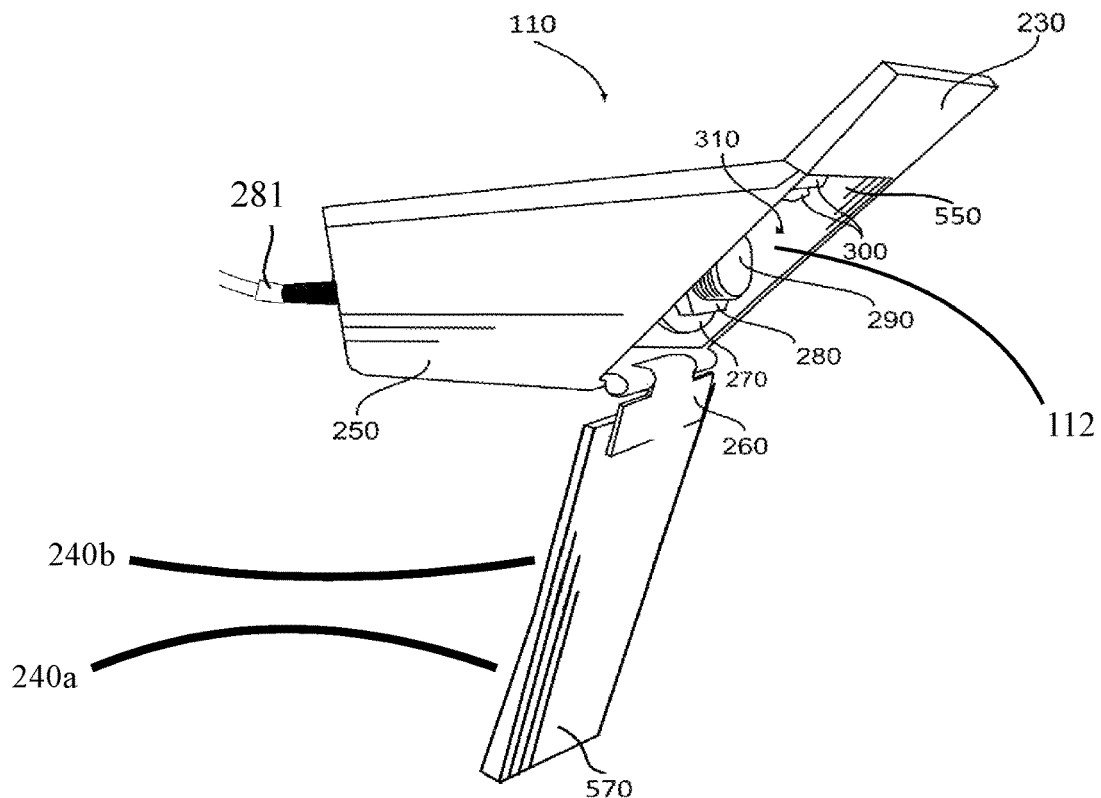
FIG. 3A refers to a perspective side view of some embodiments of a bonding equipment safety apparatus.
Figure 3B:
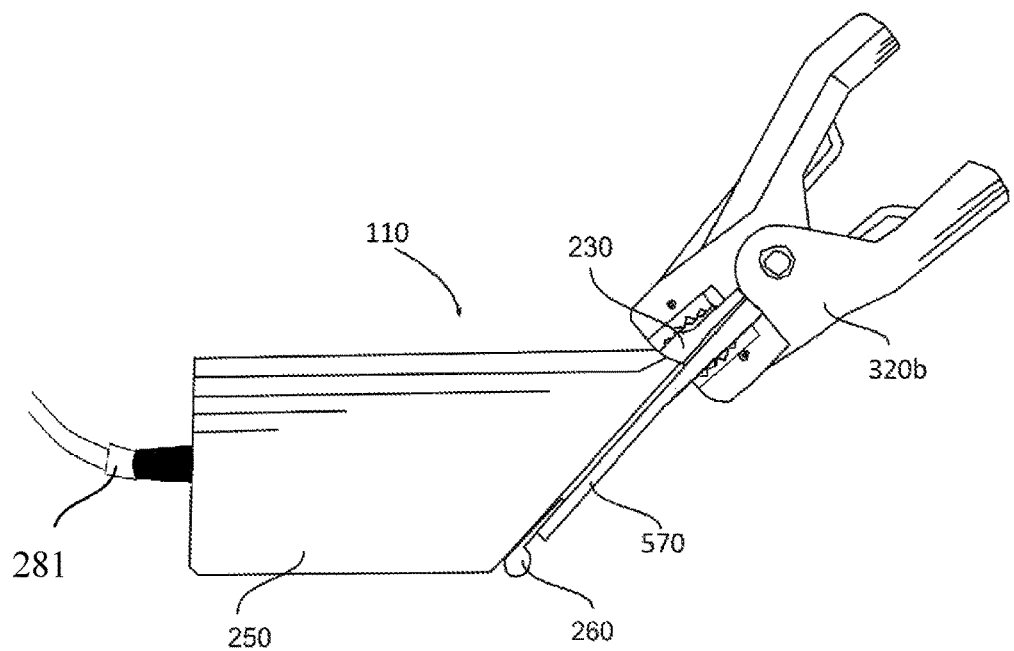
FIG. 3B refers to a side view of the embodiment of the bonding equipment safety apparatus as shown in FIG. 3A.
Figure 3C:
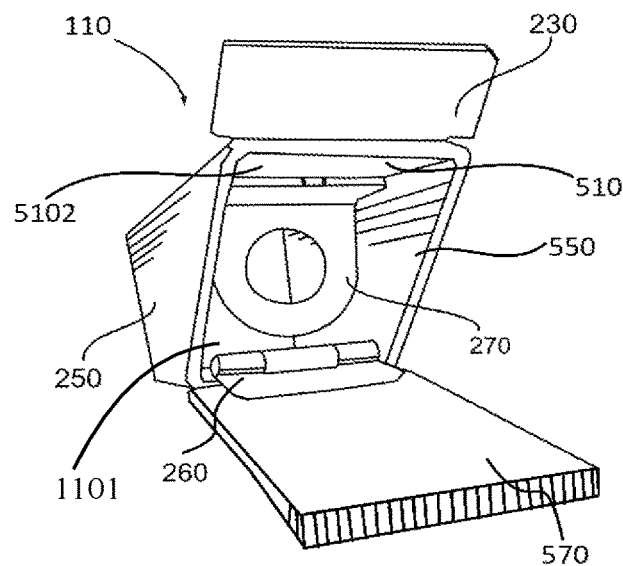
FIG. 3C refers to a perspective front view of the embodiment of the bonding equipment safety apparatus as shown in FIG. 3A except that the sensor 290 is not present in FIG. 3C.
Figure 3D:
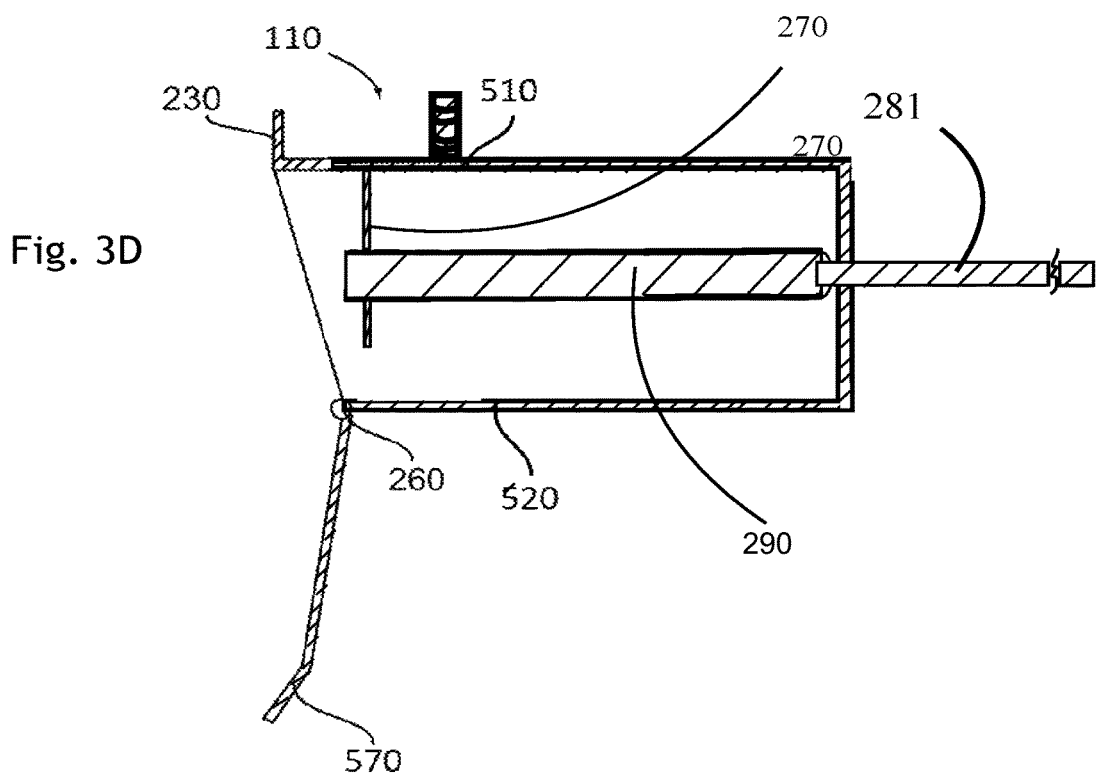
FIG. 3D refers to a depiction of a cross-sectional side view of some embodiments of the bonding equipment safety apparatus in an open position (see the description for FIG. 2C for information about the viewpoint)

FIG. 2C shows the sensor while FIG. 3C does not show the sensor; the plane upon which the sectional view is taken for FIG. 3D is shown by the dotted line, with the reference arrow showing the direction of the view that is later shown in FIG. 3D; mounting member 270 may be of any shape and is preferably configured to have a void that is configured to receive a sensor; here in FIG. 2C the void is circular and the line that is shown traversing the void represents the end of a wall of the housing 110;

FIG. 3A depicts a side view of some embodiments of a bonding equipment safety apparatus 100; in some embodiments of the bonding equipment safety apparatus, the door is in a downward position, and a sensor, such as a proximity sensor 290, detects the absence of the door in an upward position, and the proximity sensor 290 then sends a signal, directly or indirectly, to the brake interlocking system thereby releasing the brake; depicts some embodiments of bonding equipment safety apparatus 100 having a door 570; housing 110 may be rigid and may be constructed of rigid square tubing, approximately 2" by 2" by 6", but may be smaller or larger. In some embodiments the size of the housing 110 is related depending on the size needed to enclose the sensor or switch.

Referring to FIG. 3A, a flange 230 is disclosed; flange 230 may be a flange protruding, at an angle, from the housing. In some embodiments, the angle at which the flange 230 protrudes may be between 2 degrees and 90 degrees; in some embodiments, the angle at which the flange 230 protrudes may be between 30 degrees and 60 degrees, or may be between 30 degrees to 89 degrees, or may be between 60 degrees to 85 degrees, or may be between 75 degrees to 85 degrees, as determined by the acute angle formed by the flange 230 with respect to a horizontal plane. Preferably, the angle at which the flange 230 protrudes is such that a door 570 resting against the flange 230 will tend to fall away from the flange 230 by gravitational forces unless the flange 230 is adjustably secured to door 570, such as by a bonding cable clamp 320b in clamping contact with both the door 570 and the flange 230. Door 570 may be rigid and attached, preferably at an end, to a hinge 260. Some embodiments of left wall 250 of housing 110 are depicted.

Some embodiments of mounting member 270 are shown in FIG. 3a; mounting member 270 may be disposed within housing 110; mounting member 270 may provide a surface upon which a sensor 290 may be mounted; In some embodiments, mounting member 270 may have a slotted member that allows it to be slid forward or backward along a slotted member track that may be installed upon one of the interior surfaces of a wall of the housing 110. Mounting member 270 may be a fastener that is detachably couplable to sensor 290; In some embodiments, sensor 290, such as a proximity switch, may be detachably coupled to the housing 110 via the mounting member 270; in some embodiments; sensor 290, such as a proximity switch or valve, may be directly mounted to an interior surface of the housing. In some embodiments, mounting member 270 may include a washer or a threaded washer such that a sensor 290, such as a threaded proximity switch, may be detachably coupled, such as being threadedly coupled, to the mounting member 270. In some embodiments, mounting member 270 is substantially L-shaped; In some embodiments, mounting member 270 may have at least one flange. In some embodiments, the mounting member 270 may be configurable such that a user may adjust the position of a sensor 290 with respect to the position of the hinge 260. Mounting member 270 may be a welded clamp, such as an L-clamp, or mounting member 270 may include a washer, such as circular washer or a square washer; mounting member may include a nut, such as a nut coupled to a washer. In some methods of use of some embodiments, a user may partially unfasten or completely unfasten a sensor 290 such as a proximity switch, coupled to the mounting member 270, then slide along a horizontal axis the sensor 290 so as to bring the sensor 290 closer or further away from the door 570. By adjusting the location or position of the sensor 290, the sensitivity of the sensor 290 to the presence of the door 570 may be adjusted. In some embodiments, a nut may be coupled to the front of the mounting member 270, and a second nut may be coupled to the back of the mounting member 270. Sensor 290, which may be a sensor 291, may be welded or otherwise coupled to an interior surface of the housing 110. In some embodiments, mounting member 270 may include a threaded bung 280, and threaded bung 280 may be couplable to the sensor 290, which may be a sensor 291. In some embodiments, the nut, or one of the nuts, of the mounting member 270 may be a threaded bung 280 that is directly coupled or indirectly to the mounting member, such as by welding or by a fastener.

Sensor 290, which in some preferred embodiments is a proximity switch or proximity sensor 290, may also be a depressable on-off switch that electrically breaks a circuit when in the on position, such as being depressed. In some embodiments, sensor 290 may be a pneumatic switch, which may be communicatively coupled to a pneumatic-operated system for activating or deactivating a brake or brake system; in some embodiments, sensor 290 may be pressure-sensitive and may be activated by a physical object exerting pressure on the switch, which may occur when the door 570 or member protruding from a surface of the door 570, that is the surface of the door 570 that faces the sensor 290 when the hinged door 570 has been closed thereby being sufficiently proximate for detection by the sensor 290. Some embodiments of bonding equipment safety apparatus 100 may selectively activate or selectively deactivate electronic sensors of a braking system that uses electricity to activate brakes, or, in some embodiments, to deactivate brakes that were already activated at the time that the sensor 290 determined that the hinged door 570 was sufficiently proximate. In some embodiments, after a user clamps the door 570 of the housing 110, thereby indirectly notifying the switch assembly 289 to deactivate the braking system of the vehicle and putting the vehicle in drivable condition. When a user then removes the clamp from being clamped to the flange and the door, then the door will fall open in part or wholly by gravitational forces, and the proximity sensor 290 then detects the absence of an object in sufficient proximity to be detected, and the switch assembly 289, via a communicated signal from the proximity sensor 290, may be configured in the preferred embodiments to then activate the braking system of the vehicle or deactivate the vehicular movement control system of the vehicle, such as the transmission system of the vehicle. When the door is clamped in place, the switch assembly 289 may then deactivate the braking system or activate the vehicular movement control system. In some embodiments, the switch assembly 289 is configured to ignore objects that are in sufficient proximity to be detected when the objects do not meet a time threshold, that is are only in sufficient proximity for a short period of time such as less than 3 seconds or less than ten seconds or less than one minute. In some preferred embodiments, the proximity sensor 290 is configured to detect a metallic object of a door 570 that is primarily metal and larger than one inch by one inch, thereby avoiding the false positive of a metallic wedding band or other object being present in front of the proximity sensor 290 while the user is performing work in front of the proximity sensor 290 when the door 570 is open. Some trucks that have a pneumatically-controlled braking system may then be activated or deactivated when a door 570 of the housing is closed (in some embodiments a user will keep the door in a closed position by clipping an alligator clip or other type of clamp to the door flange such that a portion of the door, such as an upper portion will be in contact with the door flange. A protruding member of a door 570, such as a ball-shaped member 405 (see FIG. 6C in which the ball-shaped member 405 may be coupled to an actuator for actuating airflow of an airline to indirectly control a braking system, may selectively engage with an air valve, that may be coupled to a switch that is pressure sensitive and when the door 570 is open or closed it changes it and adds the circuit; some trucks are electronic and use electronic sensors. Some braking systems use pneumatic devices, which includes a pressure release valve or an air valve with a ball on the end of the valve such that a protruding member on the door 570, or the door 570 itself, may press against ball, thereby releasing air and thereby turning off the braking system so that the user may drive a vehicle 102. Once you come to a stop you would apply the park brake manually in the cab with an air switch. If you forget to set the park brake and engage one of the interlocks, the park brake will automatically come on.

As some embodiments are shown in FIG. 3a, protrusion 300 is optional and may be a metallic protrusion. Protrusion 300 may provide a clamping surface for the clamp; protrusion 300 may provide a stopping surface for stopping the door 570 when the door 570 is in a closed position such that the door 570 is aligned with the flange 230. An interior compartment 310 of housing 110 may provide an area for disposing a sensor.

FIG. 3B refers to a side view of the embodiment of the bonding equipment safety apparatus as shown in FIG. 3A, in which the bonding cable clamp is coupled to the door and the housing of the bonding equipment safety apparatus 100, such that the proximity sensor 290 detects the door in an upward position and the proximity sensor 290 then directly or indirectly communicates with the braking interlocking system to signal that the braking should be set in braking mode;

FIG. 3D also shows a bonding equipment safety apparatus 100.

Figure 3E:
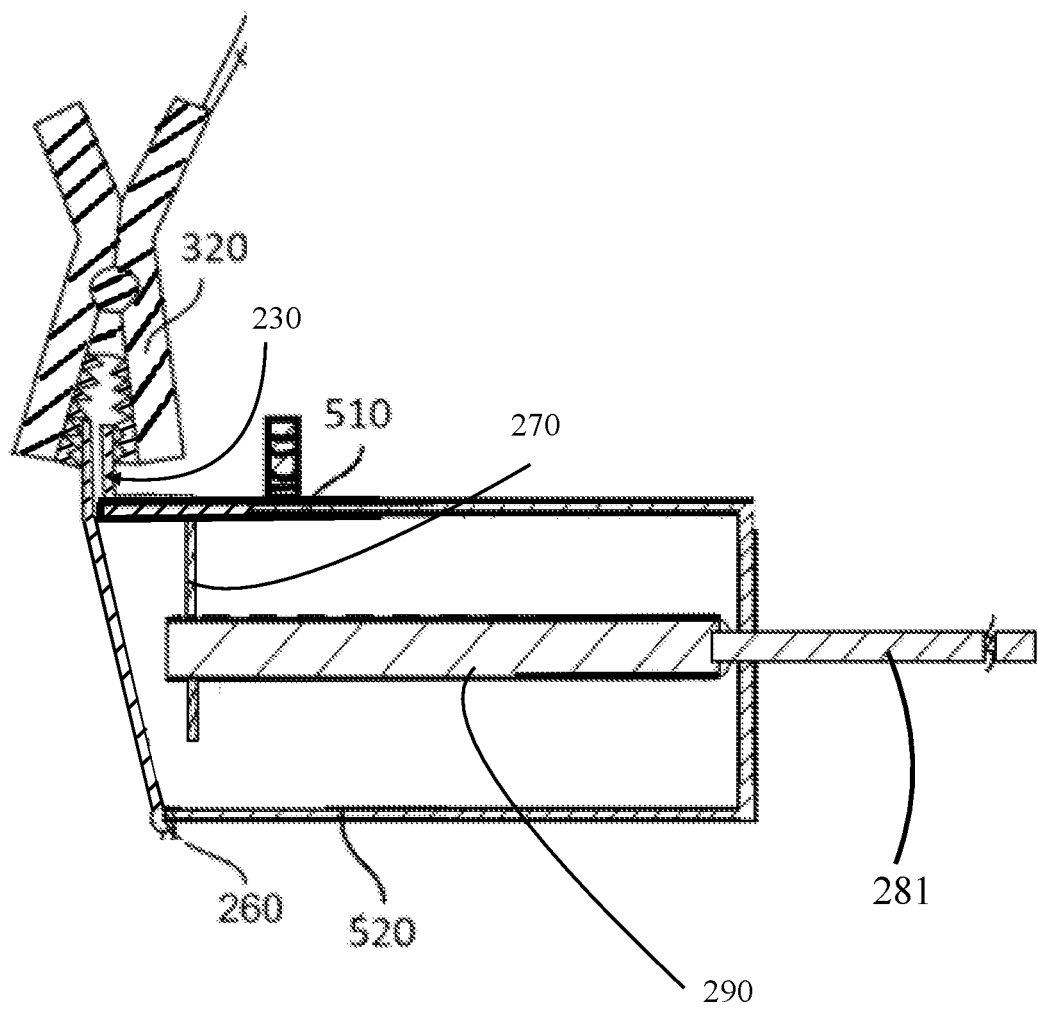
FIG. 3E refers to a depiction of a cross-sectional side view of some embodiments of the bonding equipment safety apparatus in a closed position; the some embodiments in FIG. 3E are similar to the some embodiments depicted in FIG. 3D, except the door 570 of the housing 110 is in a closed position and a clamp, such as a distal clamp 320, holds the door against a flange 230; a FIG. 3F refers to a depiction of a front perspective view of some embodiments of the bonding equipment safety apparatus in an open position.

FIG. 3E refers to a depiction of a cross-sectional side view of some embodiments of the bonding equipment safety apparatus in a closed position; the some embodiments in FIG. 3E are similar to the some embodiments depicted in FIG. 3D, except the door 570 of the housing 110 is in a closed position and a clamp, such as a distal clamp 320, holds the door against a flange 230; a sensor cable 281 communicatively couples sensor 290 with a switch 291 (not shown in FIG. 3E).

Figures 3F, 3G:
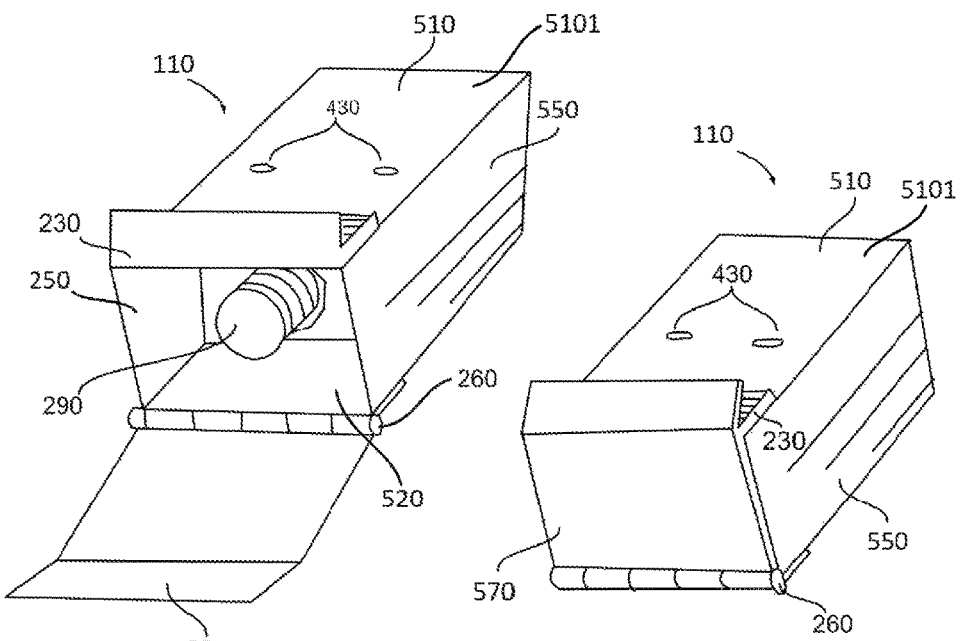
FIG. 3G refers to a front perspective view depiction of some embodiments of the bonding equipment safety apparatus depicted in FIG. 3F in a closed position.
Figure 3H:
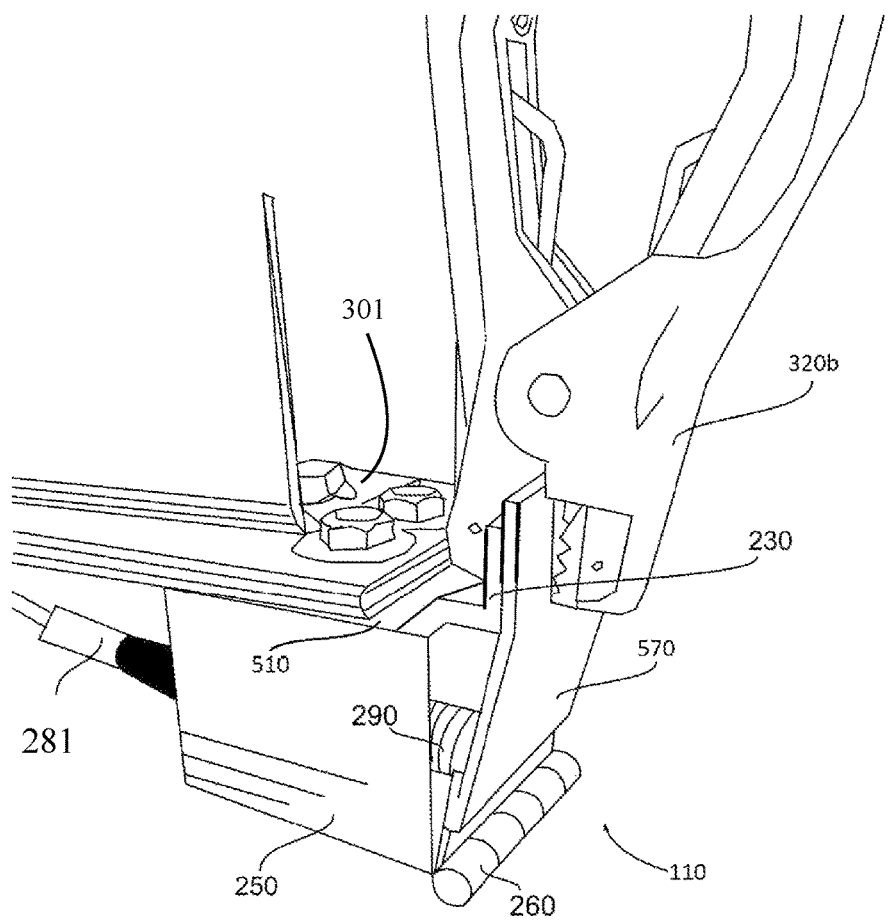
FIG. 3H refers to a front perspective view depiction of some embodiments of the bonding equipment safety apparatus, in a closed position, that is coupled to a hitch 301 of a vehicle, such as a truck.

FIG. 3H refers to a front perspective view depiction of some embodiments of the bonding equipment safety apparatus, in a closed position, that is coupled to a hitch 301 of a vehicle, such as a truck.

Figure 4:
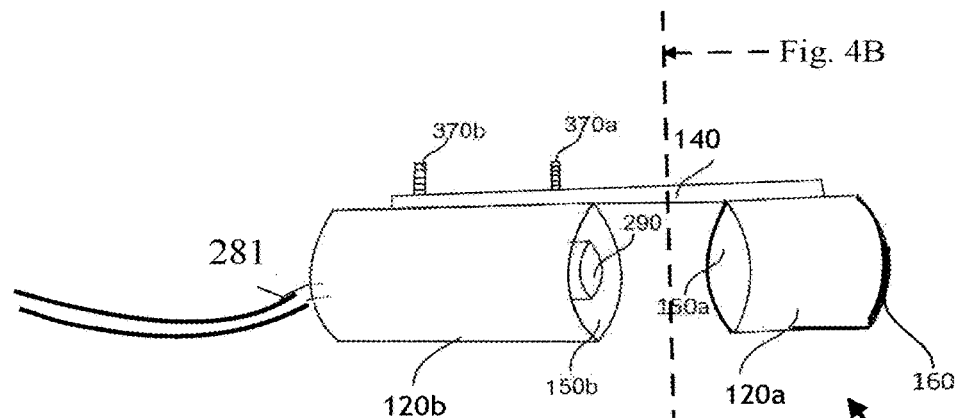
FIG. 4A refers to an alternative embodiment of FIG. 2A.
FIG. 4B refers to a sectional view showing a portion of the embodiment of the alternative embodiment shown in FIG. 4A.
Figure 4B:
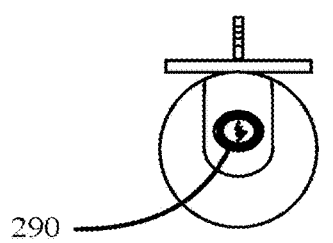

Referring to FIG. 4, some embodiments of bonding equipment safety apparatus 100 are depicted, which may include curved-face housing 221; housing 221 may be a rigid tubular device, and may have a base member 140, which may be a rod; base member 140 may be coupled to fastener 370a and fastener 370b.

First member 120a may be a smaller tubing member and may be hollow. Second hollow member 120b may be a larger tubing member. First cavity 150a may be a hole of first hollow member 120a. Second cavity 150b may be a hole of the second member 120b. Base member 140 may be a rod.

Fastener 370a and fastener 370b may be mounting bolts that couple the housing 221 to the 120 a//or the second member 120b. A sensor 290 may be disposed inside second member 120b. Airline 380, which may be a tube configured to carry air, may couple sensor 290 to a pneumatic braking system; Tube 380 may be a sensor wire communicatively coupling a sensor 290 to a vehicle 102, such a truck or a braking system of vehicle 102.

Bonding cable 390 is depicted in FIG. 3E.

Referring to FIG. 3E, fastener 370a is depicted; fastener 370a may be used for mounting the housing 110 to a surface.

Mounting holes 430, 430 of housing 110 are depicted in FIG. 3F. Referring to FIG. 3F, some embodiments of housing 110 are shown; housing 110 may be constructed of stainless steel or metal; housing 110 may be tubing. Top wall 510 comprising an outer surface 5101 is depicted.

A first embodiment is depicted in FIG. 3 and related figures and may use a sensor 290, such as sensor switch or valve, which may be mounted inside of a housing 110, such as a rigid housing, on mounting member 270, which may be a mounting tab, mountable washer, or bracket. The rigid housing 110 may be constructed of rigid square tubing, in some embodiments approximately 2"×2"×6", but may be smaller or larger depending on the size needed to enclose the sensor or switch. 290. The top side of the housing may be longer than the bottom side, creating approximately a 5-degree to 89-degree angle, but may also be between 5 degrees and 45 degrees, from the horizontal plane, which may enable a door 570 to open with the force of gravity when the clamp or plug is removed or not attached to the door 570 and the housing. The front of the device may be a door 570 constructed of a flat, rigid piece with a free-swinging hinge on the bottom, which may be connected to the bottom of the tubing, which may be rigid. The door 570 hinges may be configured so that the door 570 may rotate along an axis perpendicular to the main length of the door 570 to open away from the housing and hang below the device. When closed, the door 570 extends past the top of the housing and aligns with a flange 230, equal to the width of the housing, which may be attached to the top of the rigid housing, extending vertically to create a clamp point for the bonding cable assembly 392 (see FIG. 3D). The sides of the rigid housing may be cut at an angle, to allow the door 570 to have a flush surface with the housing when closed. The back of the product may have a plastic cap 440 inserted into the tubing, to limit the sensor, valve, or sensor 290 exposure to the elements and also support airline 380, which may be wires or some airline s connected to the sensor, valve or sensor 290.

Sensor 290 is preferably a non-contact sensor, such as a proximity sensor 290; some preferred embodiments of bonding equipment safety apparatus 100 may use a proximity sensor 290 for the non-contact sensor; however, sensor 290 may be a sensor selected from the group consisting of vision and imaging sensors, proximity sensor 290 s, pressure sensors, position sensors, photoelectric sensors, metal sensors, chemical sensors, force sensors, electrical sensors, contact sensors, and non-contact sensors.

"Proximity sensing is the technique of detecting the presence or absence of an object with an electronic non-contact sensor. There are capacitive proximity sensors and inductive proximity sensors. Capacitive proximity sensors are designed to detect both metallic and nonmetallic targets. They are ideally suited for liquid level control and for sensing powdered or granulated material. Inductive proximity sensors are sensing devices that detects metal targets using electromagnetic energy. They are immune to dirt and grease which makes them ideal for adverse environmental conditions." See https://www.eaton.com/us/en-us/products/controls-drives-automation-sensors/sensors---limit-switches/understanding-sensors-and-limit-switches--.html.

Sensor 290 may be coupled to a valve such as a valve that allows the transmission of air through tubing. Sensor 290 may be coupled to tubing.

Some embodiments may use a sensor 290, which may be mounted inside a housing 110 via a mounting bracket or washer. Sensor 290 may also be a sensor-switch; or sensor 290 may be coupled to switch 291; the sensor 291 may be communicatively coupled to the brakes such that when the sensor 291 has been set to a on position, then the sensor 291 directly activates, or indirectly activates, such as via switch 291, via wires or via wireless transmission, the brakes into activated states such that the brakes of a safety brake interlock system prevent the vehicle 102 from being driven. In some embodiments, the sensor 291 indirectly activates, via wires or via wireless transmission, the brakes by first communicating with the safety brake interlock system, and the safety brake interlock system then activates the brakes.

A base member 140 may be coupled to the rigid tubing and across to another rigid tubing, which may be approximately 1 inch in length and 1½ inches in diameter. The smaller tubing's 120a purpose is to keep the clamp upright and in its proper position and allows for a cap or plug to be mounted to limit the exposure of the sensor to the elements. It also promotes or forces the fueler to connect the clamp to the rod in the gap. There may be approximately a 1-inch gap between the two rigid tubing 120a and 120b. The gap holds the clamp in place when attached to the base member 140 on the product. This keeps the clamp within the proximity switch's 290 sensing distance. Depending on the user's preference, the product can be bolted in any orientation, by use of mounting bolts 370a and 370b (see FIG. 4). A cap 160, which may be made of metal, plastic, or any other similar substance that has the similar function, may cap one side of the smaller tubing 120a to limit the sensor 290 exposure to the elements.

In some embodiments, a bonding clamp reel assembly 500 may be integrated with a bonding equipment safety apparatus 100. In this application, a bonding clamp reel assembly 500 integrated with a bonding equipment safety apparatus 100 is deemed an integrated bonding equipment safety apparatus 700.

A bonding equipment safety system 600 is disclosed; bonding equipment safety system 600 may include a bonding equipment safety apparatus 100 or an integrated bonding equipment safety apparatus 700, a cable connecting the bonding equipment safety apparatus 100 or the integrated bonding equipment safety apparatus 700 to a braking system 710 of a vehicle 102.

Figure 5:
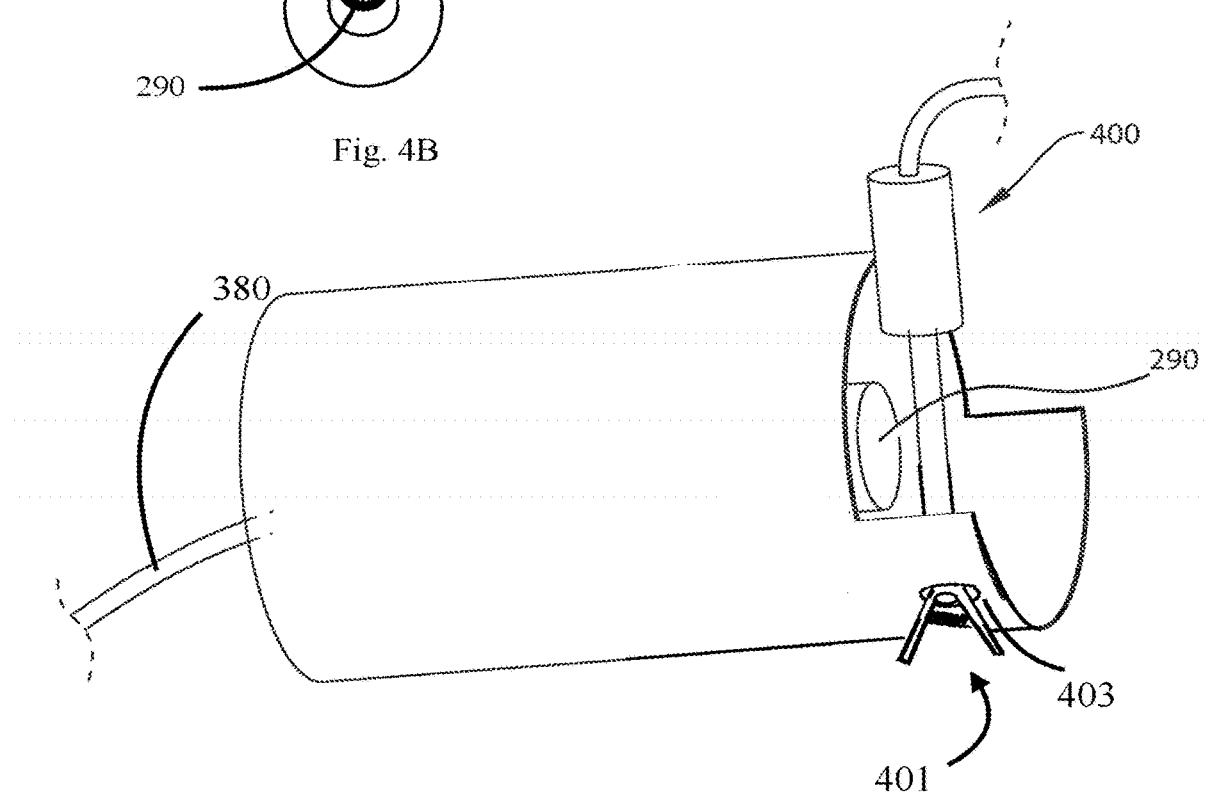
FIG. 5 refers to an embodiment of a bonding equipment safety apparatus that supports a grounding cable plug insertion such that a sensor can sense the presence of the plug and thereby alert directly or indirectly a brake interlock system.

FIG. 5 depicts some embodiments of bonding equipment safety apparatus 100, which may have an expandable clasp 401, which may be spring-loaded, coupled to a bonding plug 400 is shown, which may also be referred to as a bayonet plug or a grounding plug. Bonding equipment safety apparatus 100 may have an opening area 403 defining an opening configured to receive the bonding plug 400 so that when the bonding plug 400 is disposed within the opening area 403, the expandable clasp 401 may be in an expanded configuration such that the bonding plug 400 is stably positioned when the expandable clasp 401 is in an expanded configuration and positioned proximate to sensor 290.

Figure 6A:
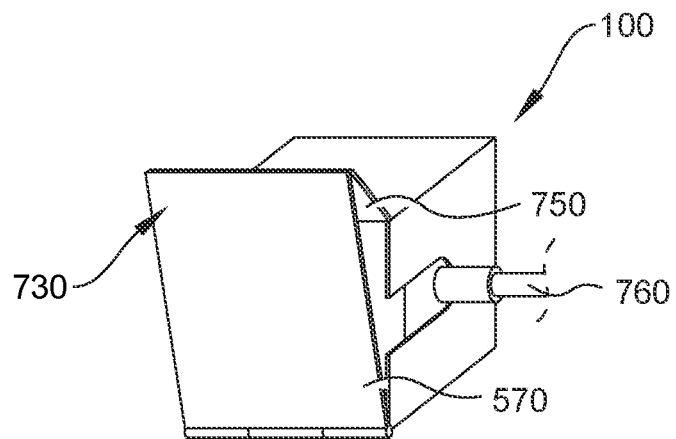
FIG. 6A refers to an embodiment of a bonding equipment safety apparatus with slots and airline s shown in a closed position.

Referring to FIG. 6A, a clamping area 730 on the door 570 is aligned with the housing or a flange 230 of a housing such that a bonding cable 390 that is clamped to both the clamping area 730 and the flange 230 of the housing; the clamping area 730 may include the entire edge of the door 570 that is parallel to the hinge. An airline 760 may be communicatively coupled to a channel of a wall of the housing, thereby, allowing the channel to transport air or other objects to an inner chamber defined by the housing.

Figures 6B, 6C:
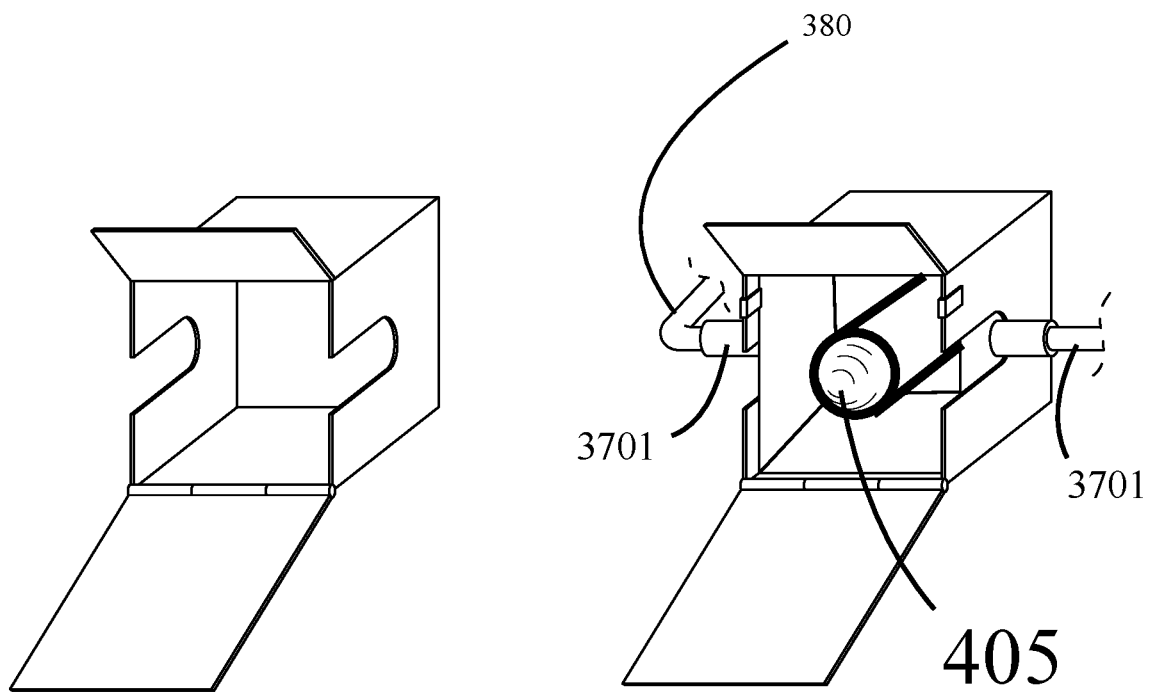
FIG. 6B refers to an embodiment of a bonding equipment safety apparatus with slots and space for a contact ball coupled to a valve configured to control airflow of an interlock brake system when the valve is depressed air valve shown in an open position.
FIG. 6C refers to an embodiment of a bonding equipment safety apparatus with slots, airline s, and a contact ball coupled to a valve configured to control airflow of an interlock brake system when the valve is depressed valve disposed within the housing shown in an open position.

Referring to FIG. 6B, a clamping point, also known as a clamping area 730, may be a flange that is coupled to the housing; slots may be disposed inside of at least one wall of the housing; the slots maybe shaped and sized so as to allow the passage of at least one airline.

Referring to FIG. 6C: a depiction of some embodiments of bonding equipment safety apparatus 100 are shown; a contact ball coupled to a valve configured to control airflow of an interlock brake system when the valve is depressed for an air valve that may be coupled to an airline 380; the contact ball may be depressable, that is, capable of being depressed, so as to actuate an air valve of the airline to control airflow thereby controlling an interlock brake system; although not shown, a contact pad or contact structure may be situated or disposed upon the door 570. Airline 381 may have connectors 3701, 3701 configured to couple airline 381 to at least one slot of housing 110.

Referring to FIG. 7, the bonding equipment safety apparatus 100, in some embodiments, may be coupled to a bonding clamp reel assembly 500, which may have a reel 501, and a bonding cable assembly 392 may be coupled to a reel 501 such that the end of the reel has a clamp, and when vehicle 102, such as a truck, is in transit mode then the clamp of the reel is coupled to a base member of the bonding equipment safety apparatus 100, which is coupled to the reel.

For purposes of this application all ranges are inclusive unless otherwise stated.

Figure 8:
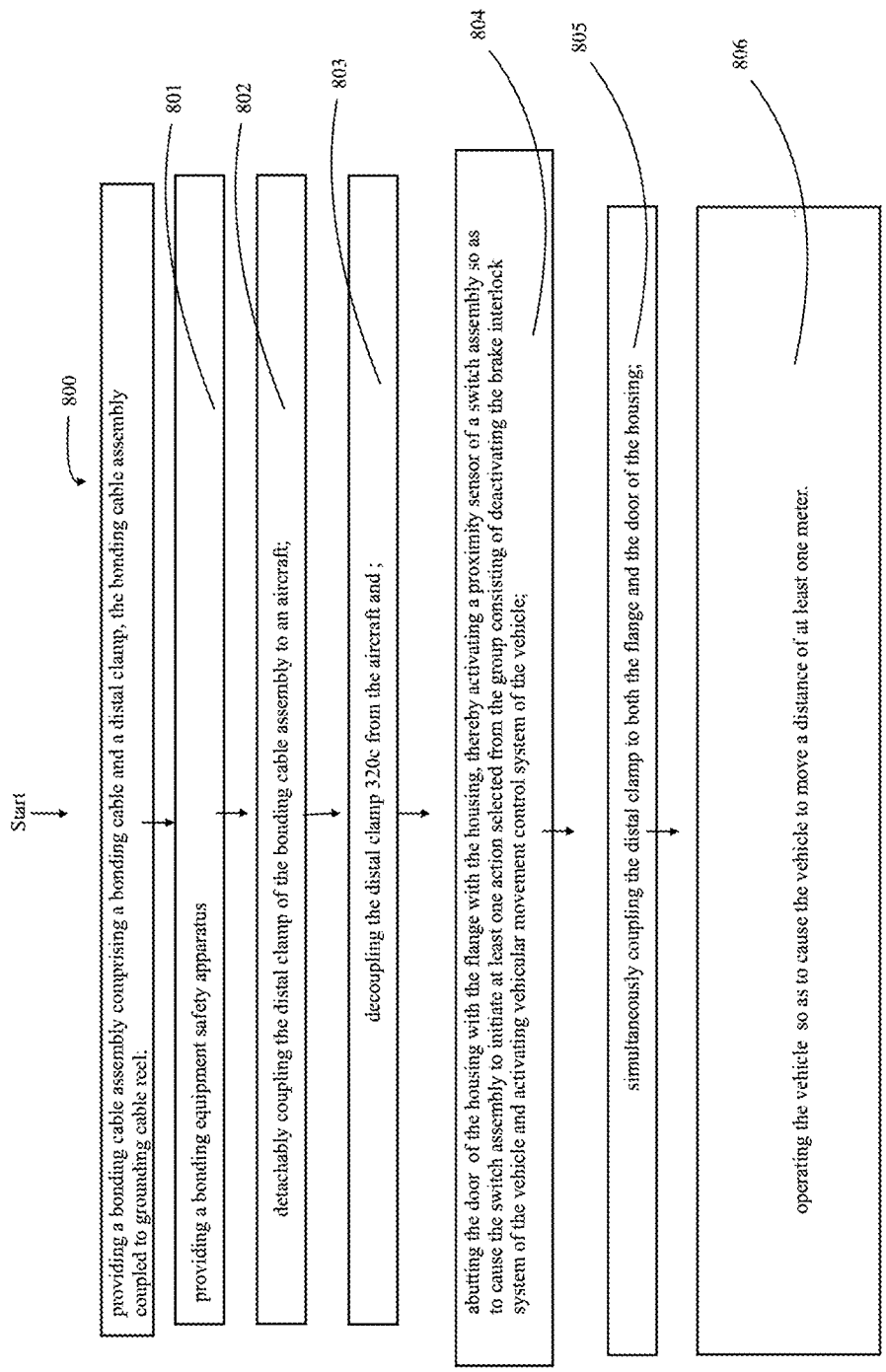
FIG. 8 depicts a flow chart of a method of use of aspects of the invention.

Referring to FIG. 8, a schematic is shown of a method of use of aspects of the invention; a method of operating a vehicle (102) comprising:

providing a bonding cable assembly 392 comprising a bonding cable 390 and a distal clamp 320c, the bonding cable assembly 392 coupled to grounding cable reel 502; providing a bonding equipment safety apparatus 100; detachably coupling the distal clamp 320c of the bonding cable assembly 392 to an aircraft; decoupling the distal clamp 320c from the aircraft and; abutting the door 570 of the housing 110 with the flange 230 with the housing 110, thereby activating a proximity sensor of a switch assembly so as to cause the switch assembly to initiate at least one action selected from the group consisting of deactivating the brake interlock system of the vehicle and activating vehicular movement control system of the vehicle 102; simultaneously coupling the distal clamp 320c to both the flange 230 and the door 570 of the housing 110; operating the vehicle 102 so as to cause the vehicle 102 to move a distance of at least one meter.

Figure 3I:
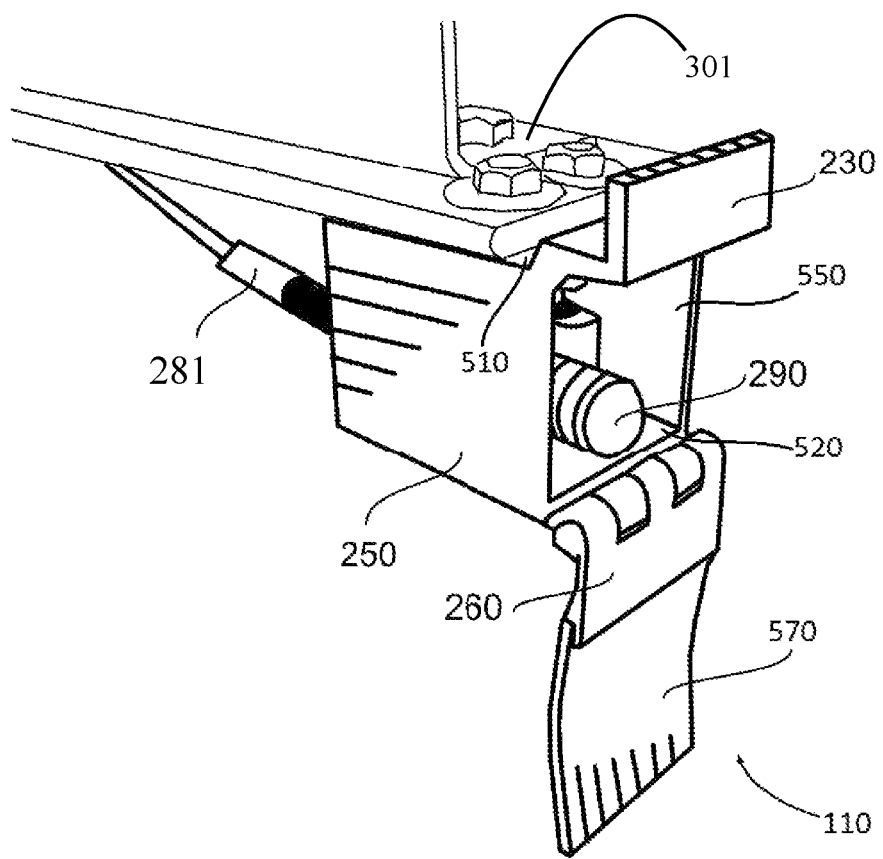
FIG. 3I refers to a front perspective view depiction of some embodiments of the bonding equipment safety apparatus, in an open position, that is coupled to a hitch 301 of a vehicle, such as a truck.
Figure 9:
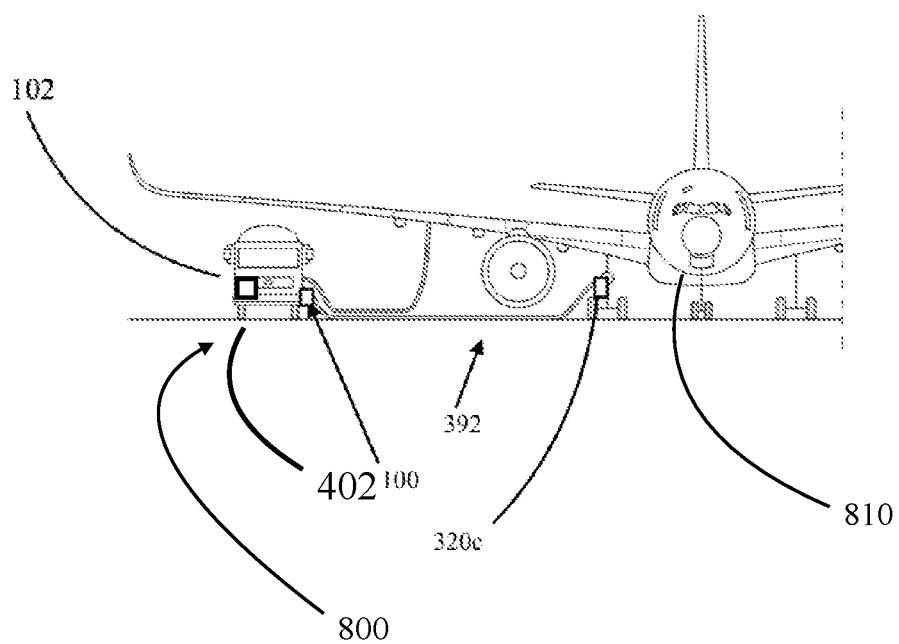
FIG. 9 depicts a schematic of a bonding equipment safety system; the schematic depicts some embodiments of a system in which an aircraft 810 is connected to a bonding cable and clamp 320 which is connected to a housing 110, such as a curved-face housing 221, having a a proximity sensor 290 disposed within the housing 110, and wherein the proximity sensor 290 is communicatively-connected to a brake interlock system which is communicatively-connected to a fueling vehicle; brake interlock systems are known in the prior art, and thus the brake interlock system 402 may be in any location of a vehicle or in any configuration known in the prior art

Referring to FIG. 9, a schematic of some embodiments of bonding equipment safety system 800 are depicted; the bonding equipment safety system 800 may include a bonding equipment safety apparatus 100, of which nonlimiting examples are depicted in greater detail at FIG. 3I and FIG. 7C; the bonding equipment safety apparatus 100 may include a distal clamp 320c (see FIG. 7C) that may be attached at a bonding clamp location on an aircraft, such as a nonlimiting example shown in FIG. 9. The bonding equipment safety apparatus 100 may have a switch assembly 289 that may include a switch 291 communicatively coupled to a sensor, such as a proximity sensor 290; a bonding cable 390 comprising a proximal clamp 320b and a distal clamp 320c; the proximal bonding cable clamp 320b attachable to the door 570 and the distal clamp 320c attachable to an aircraft 810; the switch assembly 289 communicatively and operably coupled with a vehicular-movement control system 381. A switch assembly 289 comprises at least one sensor and at least one switch; in some preferred embodiments, the sensor of the switch assembly 289 is disposed within a housing; the sensor of the switch assembly 289 may be communicatively coupled to the at least one switch. The at least one switch may be operatively coupled to a braking system of a vehicle, or the at least one switch may be operatively coupled to a drive system of a vehicle, such as a transmission. In some preferred embodiments, when the sensor detects an object, the sensor then communicates via a wire or wirelessly to the switch, and the switch may then activate the braking system of a vehicle or deactivate a drive system of a vehicle. In some embodiments the switch and the sensor are physically coupled to each other. The bonding equipment safety apparatus may have a housing 110 that is coupled to a bonding clamp reel 501 or bonding clamp reel assembly 500. Although the descriptions of embodiments may have included a plurality of walls, in some embodiments the main body of the housing is cylindrical and may have a back wall and a front door.

The bonding equipment safety system 800 may have a bonding equipment safety apparatus 100, the bonding equipment safety apparatus 100 may have a housing 110, the housing 110 may have a main body 114. The main body may have a top wall 510. The top wall may have an outer surface 5101 and an inner surface 5102. The housing 110 may also have a bottom wall that is positionally opposing the top wall 510. The housing 110 may also have left wall 250 and a right wall 550 that is positionally opposing the left wall 250; the housing 110 may have a rea wall, and a flange 230 having a height may be coupled to the top wall 510 and may protrude from the top wall 510. In some embodiments, the top wall 510, the bottom wall 520, the left wall 250, the right wall 550, the rear wall 560, and the door 570 collectively define a housing compartment 1101.

A mounting member 270 may be disposed within the housing compartment 1101 and may be coupled to at least one wall of the housing 110 selected from the group consisting of the top wall 510, the bottom wall 520, the left wall 250, the right wall 550, and the bottom wall 520; the bonding equipment safety system 800 may also include a switch assembly 289 that may have a sensor 290 and a switch 291. The sensor 290 may have a front portion 292 and a rear portion 294; the sensor 290 may be coupled to the mounting member 270 (which may be a flange, tab, or supporting member having a rigid support configured, such as with a hole, to receive a sensor and keep a sensor oriented in a certain direction); the housing 110 of the bonding equipment safety apparatus may also have a door 570 that may have a first portion 240a that is located sufficiently proximate to the sensor 290 such that the sensor detects the presence of the door 570 when the door is closed (and preferably in some embodiments does not detect the presence of the door when the door is in an open position); the door may also have a second portion 240b that is more distal to the sensor 290 than compared to the first portion of the door 570; the door 570 may be positionally opposing the rear wall 560; and, the bonding equipment safety apparatus 100 may also have a door hinge 260 of the housing 110 that is coupled to the main body 114; the bonding equipment safety system 800 may also include a bonding cable assembly 390 comprising a bonding cable and a distal clamp 320c, the bonding cable having a proximate portion that is detachably fixed to a portion of a vehicle or bonding equipment safety apparatus 100 other than the door 570; the proximal bonding cable clamp 320b attachable to the door 570 and the distal clamp 320c attachable to an aircraft 810; the switch assembly 289 communicatively and operably coupled with a vehicular-movement control system 381, such as a transmission system or other system for controlling the movement of a vehicle.

The proximity sensor 290 of bonding equipment safety system 800 may be communicatively activating a brake interlock system 402 to prevent movement of the vehicle when the proximity sensor does not detect the door 570 of the housing 110.

The proximity sensor 290 of bonding equipment safety system 800 may be communicatively activating a vehicular movement control system 381 to prevent movement of the vehicle when the proximity sensor does not detect the door 570 of the housing 110.

The bonding equipment safety system 800 may include a cylindrical housing.

Various configurations from the various embodiments may be combined into various combinations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize that many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

What is claimed is:

1. A bonding equipment safety apparatus coupled to a vehicle, the bonding equipment safety apparatus comprising:
a housing comprising
a main body of the housing, the main body comprising
a top wall, the top wall comprising an outer surface and an inner surface;
a bottom wall positionally opposing the top wall;
a left wall;
a right wall positionally opposing the left wall;
a rear wall; wherein a flange having a height is coupled to the top wall;
wherein the top wall, the bottom wall, the left wall, the right wall, the rear wall, and a door collectively define a housing compartment:
a mounting member disposed within the housing compartment and coupled to at least one wall of the housing selected from a group consisting of the top wall, the bottom wall, the left wall, the right wall, and the bottom wall;
a switch assembly comprising a sensor and a switch;
the sensor comprising a front portion and a rear portion; the sensor coupled to the mounting member;
the door comprising a first portion proximate to the sensor and a second portion distal to the sensor, the door opposing the rear wall, the door having a height; and,
a door hinge coupled to the main body;
wherein the sensor measures a proximity of an object to the sensor, wherein the sensor is substantially perpendicular to the door; the sensor operable to detect the door when the door is detachably clamped, via a distal clamp, to the flange; the top wall comprising the flange undetachably coupled to the outer surface of the top wall of the housing; wherein the top wall is facing upward, wherein the door hinge is coupled to the bottom wall and also to the door; wherein the door is hingedly swingable so as to be detachably coupled to the flange when the door is in a closed configuration.

2. The bonding equipment safety apparatus of claim 1, wherein the height of the flange and a distance between the top wall and the bottom wall is substantially equal to the height of the door.

3. The bonding equipment safety apparatus of claim 1, wherein the flange has a major length, the major length being aligned non-vertically and non-horizontally, wherein the sensor is coupled to the mounting member, wherein the sensor is positioned sufficiently near the door such that the sensor detects the door when the door is detachably coupled to the flange.

4. The bonding equipment safety apparatus of claim 1, wherein the door is angled so as to form an acute angle between the height of the door and a horizontal plane, such that when the door is detachably coupled to the flange, the acute angle is inclusively between 30 degrees and 89 degrees.

5. The bonding equipment safety apparatus of claim 1, wherein the door is angled so as to form an acute angle between the height of the door and a horizontal plane, such that when the door is detachably coupled to the flange, the acute angle is inclusively between 60 degrees and 85 degrees.

6. The bonding equipment safety apparatus of claim 1, wherein the door is angled so as to form an acute angle between the height of the door and a horizontal plane, such that when the door is detachably coupled to the flange, the acute angle is inclusively between 75 degrees and 85 degrees.

7. The bonding equipment safety apparatus of claim 1, wherein the housing is coupled to a bonding clamp reel.

8. A bonding equipment safety apparatus coupled to a vehicle, the bonding equipment safety apparatus comprising:
   a housing comprising
      a main body of the housing, the main body comprising
         a top wall, the top wall comprising an outer surface and an inner surface;
         a bottom wall positionally opposing the top wall;
         a left wall;
         a right wall positionally opposing the left wall;
         a rear wall; wherein a flange having a height is coupled to the top wall;
         wherein the top wall, the bottom wall, the left wall, the right wall, the rear wall, and a door collectively define a housing compartment;
      a mounting member disposed within the housing compartment and coupled to at least one wall of the housing selected from a group consisting of the top wall, the bottom wall, the left wall, the right wall, and the bottom wall;
      a switch assembly comprising a sensor and a switch;
         the sensor comprising a front portion and a rear portion; the sensor coupled to the mounting member;
         wherein the sensor is a proximity sensor;
      the door comprising a first portion proximate to the sensor and a second portion distal to the sensor, the door opposing the rear wall, the door having a height; and,
      a door hinge coupled to the main body;
      the top wall, wherein the flange is undetachably coupled to the outer surface of the top wall of the housing; wherein the door is facing downward and is hingedly swingable in a downward direction substantially away from the top wall.

9. A bonding equipment safety apparatus coupled to a vehicle, the bonding equipment safety apparatus comprising:
   a housing comprising
      a main body of the housing, the main body comprising
         a top wall, the top wall comprising an outer surface and an inner surface;
         a bottom wall positionally opposing the top wall;
         a left wall;
         a right wall positionally opposing the left wall;
         a rear wall; wherein a flange having a height is coupled to the top wall;
         wherein the top wall, the bottom wall, the left wall, the right wall, the rear wall, and a door collectively define a housing compartment;
      a mounting member disposed within the housing compartment and coupled to at least one wall of the housing selected from a group consisting of the top wall, the bottom wall, the left wall, the right wall, and the bottom wall;
      a switch assembly comprising a sensor and a switch;
         the sensor comprising a front portion and a rear portion; the sensor coupled to the mounting member;
      the door comprising a first portion proximate to the sensor and a second portion distal to the sensor, the door opposing the rear wall, the door having a height; and,
      a door hinge coupled to the main body;
      wherein a combined height of the door and the flange is greater than 1 inch and less than 500 inches, wherein the height of the flange is at least 0.25 inches.

10. A bonding equipment safety system comprising a bonding equipment safety apparatus coupled to a vehicle, the bonding equipment safety apparatus comprising
   a housing comprising
      a main body of the housing, the main body comprising
         a top wall, the top wall comprising an outer surface and an inner surface;
         a bottom wall positionally opposing the top wall;
         a left wall;
         a right wall positionally opposing the left wall;
         a rear wall; wherein a flange having a height is coupled to the top wall;
         wherein the top wall, the bottom wall, the left wall, the right wall, the rear wall, and a door collectively define a housing compartment;
      a mounting member disposed within the housing compartment and coupled to at least one wall of the housing selected from a group consisting of the top wall, the bottom wall, the left wall, the right wall, and the bottom wall;
      a switch assembly comprising a sensor and a switch;
         the sensor comprising a front portion and a rear portion; the sensor coupled to the mounting member;
      the door comprising a first portion proximate to the sensor and a second portion distal to the sensor, the door opposing the rear wall, the door having a height; and,
      a door hinge coupled to the main body;
   a bonding cable assembly comprising a bonding cable and a distal clamp, the bonding cable having a proximate portion that is detachably fixed to a portion of the vehicle or the bonding equipment safety apparatus other than the door; the distal clamp attachable to the door, and the distal clamp attachable to an aircraft; the switch assembly communicatively and operably coupled with a vehicular-movement control system.

11. The bonding equipment safety system of claim 10, wherein the sensor is communicatively activating a brake interlock system to prevent movement of the vehicle when the sensor does not detect the door of the housing.

12. The bonding equipment safety system of claim 10, wherein the sensor is communicatively activating the vehicular-movement control system to prevent movement of the vehicle when the sensor does not detect the door of the housing.

13. The bonding equipment safety system of claim 10, wherein the main body is cylindrical.

14. A method of operating a vehicle comprising:
   providing a bonding cable assembly comprising a bonding cable and a distal clamp, the bonding cable assembly coupled to a grounding cable reel;
   providing a bonding equipment safety apparatus;

detachably coupling the distal clamp of the bonding cable assembly to an aircraft;

decoupling the distal clamp from the aircraft and;
- abutting a door of a housing with a flange on the housing, thereby activating a proximity sensor of a switch assembly so as to cause the switch assembly to initiate at least one action selected from a group consisting of deactivating a brake interlock system of the vehicle and activating a vehicular movement control system of the vehicle;

simultaneously coupling the distal clamp to both the flange and the door of the housing;

operating the vehicle so as to cause the vehicle to move a distance of at least one meter.

* * * * *